United States Patent
Rosolem et al.

(10) Patent No.: US 6,992,817 B2
(45) Date of Patent: Jan. 31, 2006

(54) DOUBLE PASS OPTICAL AMPLIFIER WITH UNIDIRECTIONAL COMPENSATION OF CHROMATIC DISPERSION AND OBSTRUCTION OF BACKSCATTERING

(75) Inventors: João Batista Rosolem, Campinas (BR); Antônio Amauri Juriollo, Campinas (BR); Miriam Regina Xavier De Barros, Campinas (BR); Mariza Rodriguez Horiuchi, Campinas (BR)

(73) Assignee: Fundação CPqD-Centro de Pesquisa e Desenvolvimento em Telecomunicações, Campinas (BR)

( * ) Notice: Subject to any disclaimer, the term of this patent is extended or adjusted under 35 U.S.C. 154(b) by 1 day.

(21) Appl. No.: 10/739,270

(22) Filed: Dec. 19, 2003

(65) Prior Publication Data

US 2004/0196544 A1 Oct. 7, 2004

(30) Foreign Application Priority Data

Dec. 20, 2002 (BR) .................................. 0205361

(51) Int. Cl.
H01S 3/00 (2006.01)

(52) U.S. Cl. .................................. 359/337.5
(58) Field of Classification Search ............. 359/337.5, 359/347

See application file for complete search history.

(56) References Cited

U.S. PATENT DOCUMENTS

| | | | | |
|---|---|---|---|---|
| 5,404,413 A * | 4/1995 | Delavaux et al. | ............. | 385/15 |
| 6,332,054 B1 | 12/2001 | Ito | | |
| 6,678,087 B1 * | 1/2004 | Masuda et al. | ............. | 359/334 |
| 6,785,043 B2 * | 8/2004 | Hwang et al. | ............ | 359/337.5 |
| 2002/0008901 A1 | 1/2002 | Kinoshita | | |
| 2002/0109909 A1 | 8/2002 | Kinoshita | | |

FOREIGN PATENT DOCUMENTS

JP 411046167 A * 2/1999

OTHER PUBLICATIONS

S. Nishi et al; "Highly Efficient Configuration of Erbium—Doped Fiber Amplifier", ECOC' 90 Amsterdam, vol. 1, pp. 99-102, 1990.

C.R. Giles; "Suppression of Polarisation Holeburning-induced Gain Anisotropy in Reflective EDFAs", Electronics Letters, vol. 30, No. 12, pp. 976-977, 1994.

* cited by examiner

Primary Examiner—Mark Hellner
(74) Attorney, Agent, or Firm—Finnegan, Henderson, Farabow, Garrett & Dunner, L.L.P.

(57) ABSTRACT

1—"A DOUBLE PASS OPTICAL AMPLIFIER WITH UNIDIRECTIONAL COMPENSATION OF CHROMATIC DISPERSION AND OBSTRUCTION OF BACKSCATTERING", composed by an EDFA, whose input/output stage is integrated by a circulator (6), and the amplification stage is composed by a pump laser (1) and an Erbium-doped fiber connected to a multiplexer (3), said amplifier, in which the optical signal undergoes an initial amplification while passing through the Erbium-doped fiber on the way through the fiber and a second amplification on the way back of the same fiber, presents, after the amplification stage, at least one dispersion compensating fiber (11), whose input and output are connected to the free extremity of the Erbium-doped fiber (2), through at least one device (12) arranged in the circuit in order to prevent the backscattering generated in the dispersion compensating fiber (11) from returning to the Erbium-doped fiber (2) and to allow the signal to travel through the dispersion compensating fiber (11) only once and in one direction, and then return to the amplifier circuit.

4 Claims, 3 Drawing Sheets

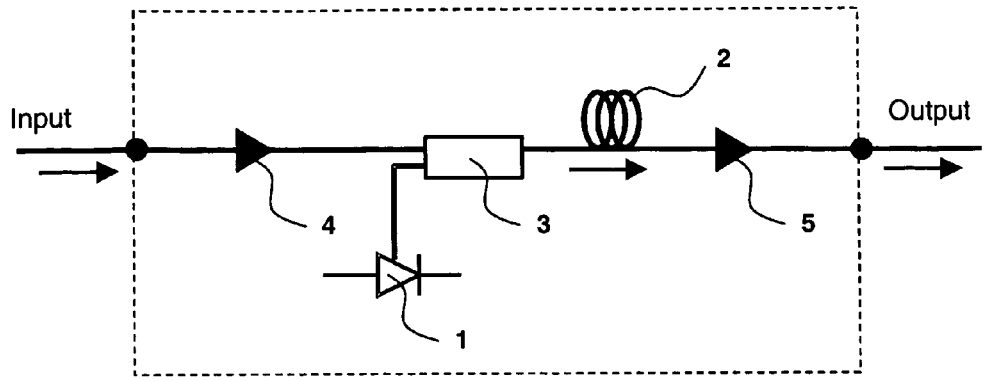
Figure 1 (Previous technique)
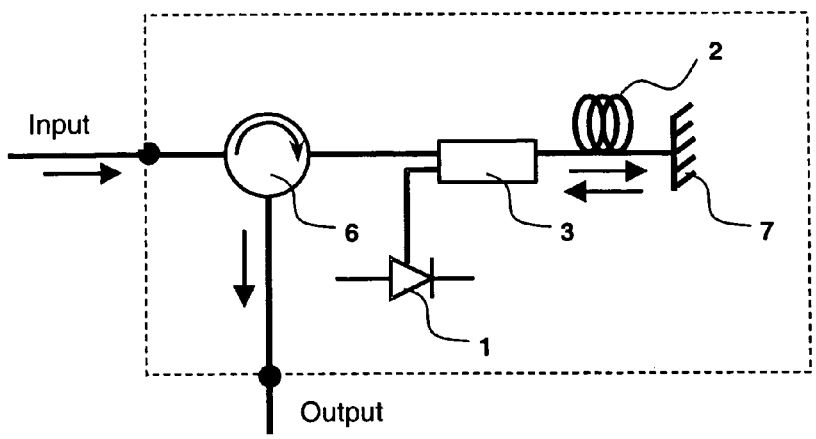
Figure 2 (Previous technique)
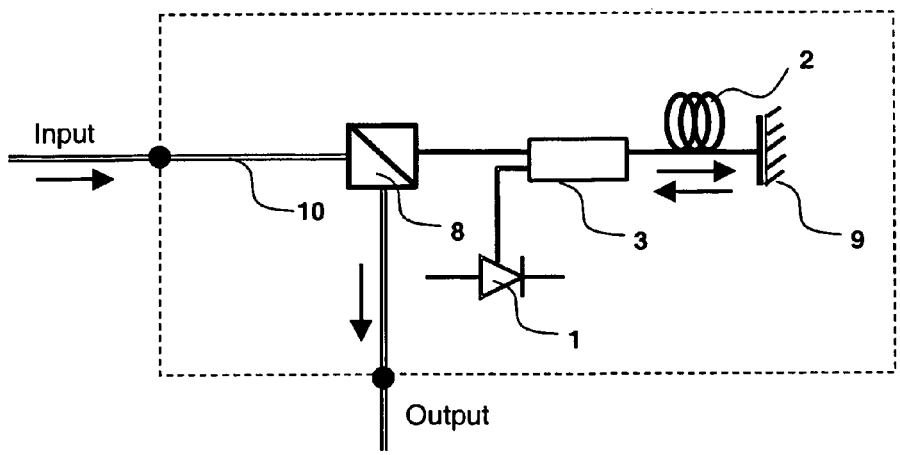
Figure 3 (Previous technique)

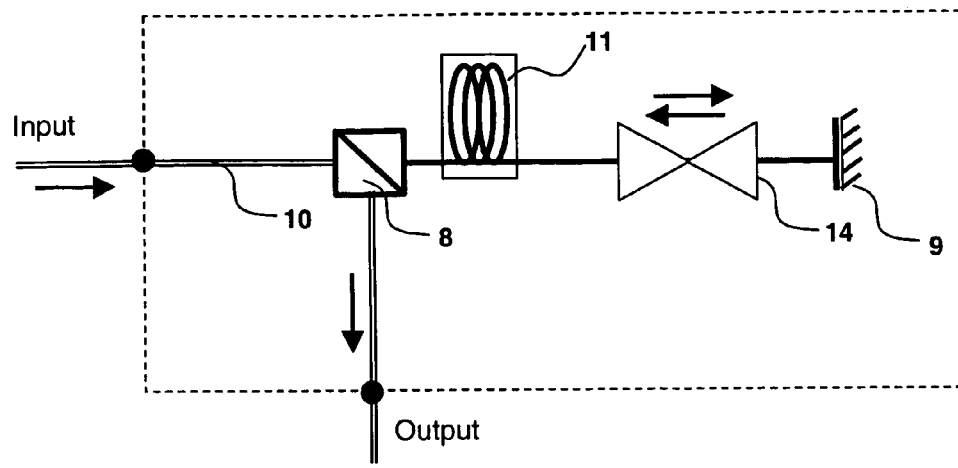
Figure 4 (Previous technique)
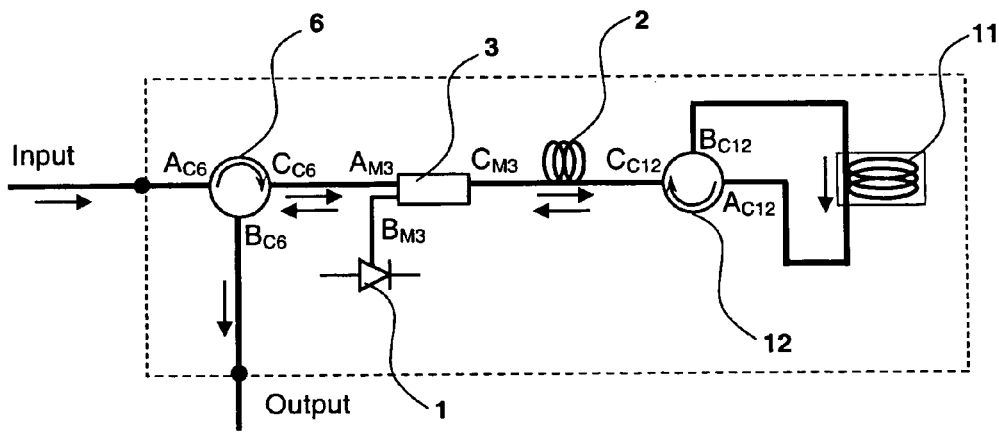
Figure 5
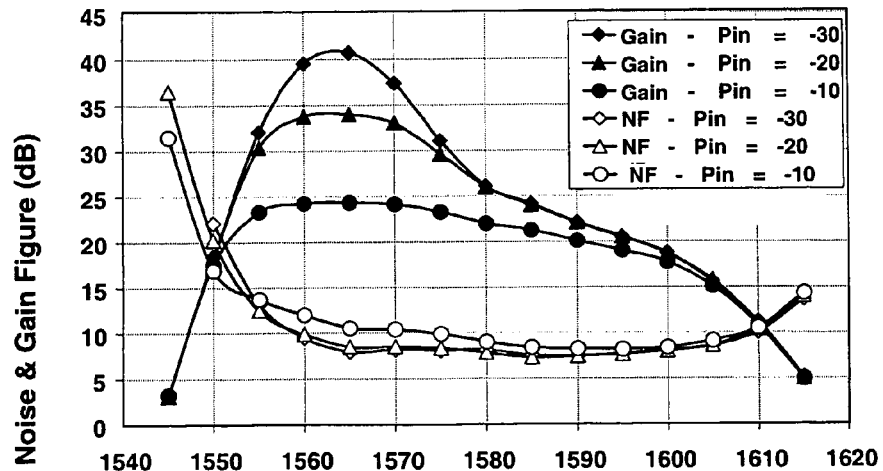
Figure 6 Wavelength (nm)
Figure 6

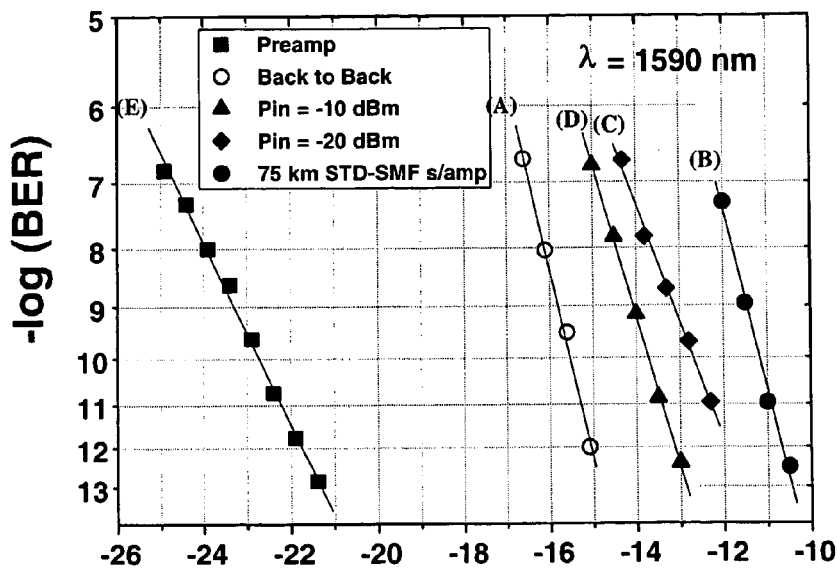
Figure 7 Power Received (dBm)
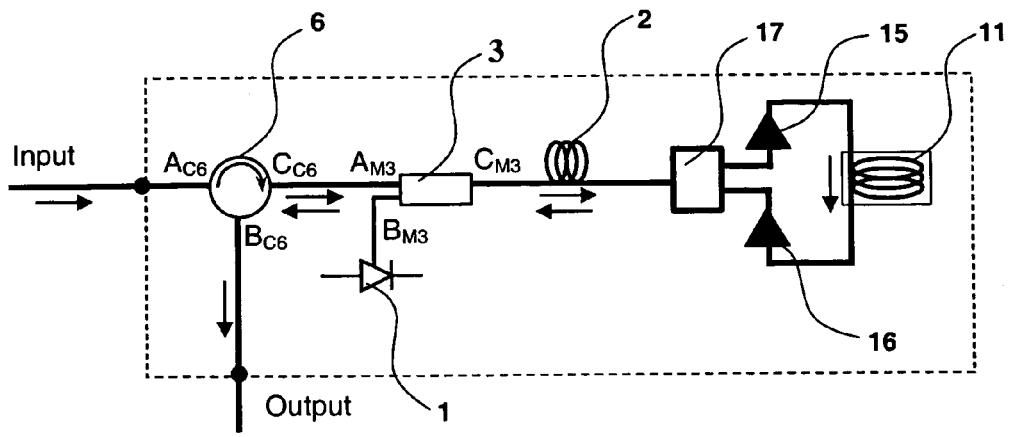
Figure 8
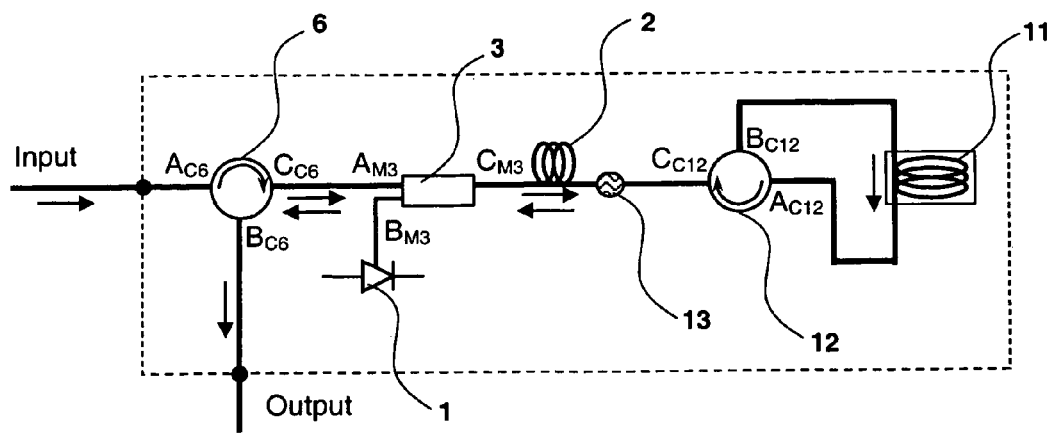
Figure 9

DOUBLE PASS OPTICAL AMPLIFIER WITH UNIDIRECTIONAL COMPENSATION OF CHROMATIC DISPERSION AND OBSTRUCTION OF BACKSCATTERING

The present invention is a device aimed at the amplification and correction of signals transmitted through fiber optics, providing, concomitantly, the amplification and the compensation of signal chromatic dispersion, and avoiding their degradation by means of the obstruction of the backscattering.

There are several advantages regarding the usage of fiber optics in the transmission of digital signals both in short and long distances, although it presents features pretty advantageous when compared to other means of transmission such as radio, satellite, coax cable or twisted pair, the fiber optic is subject to some effects that lead to the degradation of signals that it transmits.

One of the effects that lead to degradation of signals in the fiber optics consists on the attenuation that the optical signal undergoes when it travels the fiber. This effect is well-known due to the light scattering known as the Raleigh scattering. The attenuation caused by the Raleigh scattering depends on the wavelength of the signal transmitted by the fiber. The lesser attenuation in the silica fiber occurs in the optical spectrum region where the light presents a wavelength of around 1550 nm. For this reason, the transmission by fiber optic through long distances occurs mainly within this wavelength, also known as "Third Spectral Window". The typical values of attenuation in this window are of 0.25 dB/km. In other words, after traveling a distance of 80 km in the fiber the signal is attenuated in about 20 dB, or, in linear units, 100 times less than the initial value. On the other hand, the optical equipment of reception presents a reception limits that are quite narrow, with received power values between −25 and −35 dBm, while the optical signals are transmitted with power levels around 0 dBm. Considering the deviations resulting from the operation margins and the losses in the fiber splices, in a link of 100 km, the signal will be very close to the inferior limit of the reception device. Yet, by experience, there are connections of long distance systems, where the links exceed 100 km, that implies the need of recovering of the signal level along the link. To solve such problem, EDFAs (Erbium-Doped Fiber Amplifiers) are used.

EDFAs present several optical circuits configurations, each one presents advantageous and disadvantageous features. In its basic configuration, the EDFAs contain internal optical circuits (FIG. 1) composed by a pump laser (1), a given Erbium-doped fiber length (2), pump/signal multiplexer couplers (3) and insulators (4 and 5). In this configuration, the signal originated from the link of fibers or optical emitter enters the EDFA through the insulator (4), goes through the multiplexer (3) where it is added with the power originated from the pump laser (1), then, being amplified in the Erbium-doped fiber (2), and after that, it will exit the EDFA through the insulator (5). In this circuit, the insulators (4 and 5) force the signal to travel only in the emitter/receiver direction, and avoid the return of undesirable reflections on the opposite direction.

Another EDFA configuration that is frequently used was described by S. Nishi et al ("Highly efficient configuration of erbium doped fiber amplifier", ECOC'90, Amsterdam, Vol.1, pp. 99–102, 1990) and consists of a reflective configuration (FIG. 2) in which the signal enters the EDFA through an optical circulator (6), goes through the multiplexer (3) where it is added with the power originated from the pump laser (1), then, being amplified in the Erbium-doped fiber (2), and after that, it is reflected by a mirror (7) located at the end of the amplifier, which returns the signal through the same optical circuit to the optical (6), where it is separated from the input signal, and then diverted to the exit. The advantage of this type of amplifier is that the double pass of the signal through the Erbium-doped fiber can result, approximately, in the doubled gain (in logarithmic units) when compared to the basic circuit amplifiers shown in FIG. 1, using basically the same components, besides providing a better equalization of gains regarding the operation spectral band.

Another configuration of the reflective amplifier (FIG. 3) is based on the conception described by C. R. Giles ("Suppression of polarization holeburning-induced gain anisotropy in reflective EDFAS", Electronics Letters, Vol. 30, n.12, pp. 976–977, June-1994), and works in a similar way as the circuit shown in FIG. 2, although the difference is that the circulator (6) is replaced by the polarization multiplexer (8), and the mirror (7) replaced by the Faraday rotator mirror (9), which rotates in 90 degrees the polarization signal applied in it, and therefore allows the polarization multiplexer (8) to distinguish and separate the signal reflected and rotated by the mirror from the backscattering, and divert the signal towards the exit. This layout, besides presenting the gain resulting from the double pass of the signal through the Erbium-doped fiber, also produces a better quality of amplified signal. However, in order to obtain a high isolation between the signals and the backscattering at the amplifier output, a thorough signal polarization control will be necessary in the input of the amplifier, as the fiber (10) used in the input of the polarization multiplexer of this specific amplifier is of the maintained polarization type, which contains preferential axis of polarization and requires the input signal to have its polarization aligned with this axis. This control may be performed either manually by a manual polarization controller, or automatically by a more complex system that uses the signal feedback. The need for such mechanisms, makes the commercial use of this type of Amplifier unfeasible, once the cost and the complexity of the necessary optical systems is increased significantly, Another effect that limits the transmission of signals along the fiber is the chromatic dispersion effect. In this case, the chromatic spectrum that composed the signal is composed by a small set of close wavelength, although different among themselves, which leave simultaneously the emitter, but reach the receiver at different moments. Such effect, occurs due to the fact that the refraction rate varies according to the wavelength, making the different wavelengths that compose the signals to travel the fiber in different speeds, also reaching the receiver at different moments, and driving the power that composes the bit to disperse and deform the pulse. To solve this problem, the following resources will be used:

use transmission with external modulation that consists on polarizing a laser with continuous current in order to reduce significantly its line width. In this case, the continuous optical power in the output is connected to the electro-optical modulator, which then, modulates the optical signal without widening the pulse. This enables the transmission of optical signals with narrow line expansion.

usage of low dispersion fibers such as the dispersion-shifted fibers (DS);

usage of non-zero dispersion-shifted fibers (NZD);

usage of special fibers that compensate the dispersion, such as the dispersion-compensating fibers (DCF).

The use of optical circuits connecting basic optical amplifiers to DCFs has been studied and published in the literature, and also being the object of some patents, such as US2002/109909 and US2002/0008901. The use of the DCF jointly with the reflection optical amplifier, specifically, is the object of patent U.S. Pat. No. 6,332,054 (FIG. 4), and consists of the variation of the circuit shown in FIG. 3, to which the DCF was added (11), before the optical amplifier stage (14) and after the input polarization multiplexer (8).

The usage of this configuration allows the isolation at the output of the EDFA, the amplified signal of the Rayleigh backscattering generated in the DCF (11), although similar to the situation in FIG. 3, from which it derives, the situation shown in FIG. 4 also requires a thorough control of polarization before the polarization multiplexer, and therefore, requires costly and complex polarization control devices.

Another backscattering that may be generated in the DCF due to the non-linear effects is the Brillouin backscattering (SBS), which consists of a non-linear effect with an appearance threshold between 5 to 10 mW of transmission power, and damages the transmitted signal due to the fact that it steals its power, and transmits it on the opposite direction.

Taking this into consideration, the objective of this invention is to provide the optical amplifier provided with dispersion compensating fiber, capable of increasing the power level of the signal transmitted through the fiber optic and, concomitantly, compensate the chromatic dispersion generated in the link, without the damaging effects of the Rayleigh and Brillouin backscattering originated from the dispersion compensating fiber.

The other purpose of this invention is to supply an optical amplifier that provides the gain advantages resulting from the double pass of signals through the Erbium-doped fiber.

Another objective of this invention is to supply an optical amplifier that produces a better quality of the amplified signal, without the requirement of a thorough polarization control before the polarization multiplexer.

The objective stated above shall be reached through the "DOUBLE PASS OPTICAL AMPLIFIER WITH UNIDIRECTIONAL COMPENSATION OF CHROMATIC DISPERSION AND OBSTRUCTION OF BACKSCATTERING", composed by an EDFA, whose input/output stage is integrated by a circulator, and the amplification stage is composed by a pump laser and an Erbium-doped fiber connected to a multiplexer, said amplifier, in which the optical signal undergoes an initial amplification while passing through the Erbium-doped fiber on the way through the fiber and a second amplification on the way back, and which presents, after the amplification stage, at least one dispersion compensating fiber (11), which presents both the input and output, connected to the free extremity of the Erbium-doped fiber (2), through at least one device (12), which is arranged in the circuit in order to avoid the backscattering generated in the dispersion compensating fiber (11) to return to the Erbium-doped fiber (2), and to allow the signal to travel through the dispersion compensating fiber (11) only once and in one direction, and then returning to the amplifier circuit.

This invention can be better understood through the following figures:

FIG. 1 represents a schematic diagram of a basic EDFA that belongs to the state of the art.

FIG. 2 represents a schematic diagram of a reflection EDFA, using an optical circulator that belongs to the state of the art.

FIG. 3 represents a schematic diagram of a reflection EDFA, using a polarization multiplexer and a Faraday rotator mirror that belongs to the state of the art.

FIG. 4 represents a schematic diagram of a reflective amplifier with Erbium-doped fiber amplifier—EDFA, using a polarization multiplexer and a Faraday rotator mirror and a joined DCF that belongs to the state of the art.

FIG. 5 represents a schematic diagram of one of the possible methods to apply the invention, showing an EDFA, in which the DCF is isolated from the amplifier circuit by a circulator.

FIG. 6 represents the Gain Curve and Noise Figure in relation to the signal wavelength, both measured in practice according to the invention shown in FIG. 5.

FIG. 7 represents the BER (Bit Error Rate) curve in relation to the input power in the amplifier, both measured in practice according to the invention represented in FIG. 5, regarding the line amplifier and pre-amplifier configurations.

FIG. 8 represents a schematic diagram of an alternative method to apply the invention, showing an EDFA, in which the DCF is isolated from the amplifier circuit by an isolator pair.

FIG. 9 represents a schematic diagram of another invention concept, in which an optical filter for amplifier gain equalization in the usage spectral band is added to the circuit.

According to FIG. 5, one method to implement the invention is to supply an array of optical devices that form an EDFA optical circuit, comprising a DCF (11) connected to the rest of the amplifier optical circuit through a circulator (12). The signal originating from the fiber link or optical emitter is inserted in the amplifier circuit through the port ($A_{C6}$) of a first optical circulator (6), which forwards the signal to a common port of input and output ($C_{C6}$), connected to port ($A_{M3}$) of the optical multiplexer (3) that forwards this signal to its output port ($C_{M3}$), together with the pump power originating from the input port ($B_{M3}$), which is connected to a pump semi-conductor laser (1). To the output port ($C_{M3}$) of the multiplexer, common to the signal and the multiplexer pump, is connected one of the extremities of a given segment of an Erbium-doped fiber (2), where the signal amplification shall occur, in both directions. The opposite extremity of the Erbium-doped fiber segment is connected to the common input and output port ($C_{C12}$) of a second optical circulator (12). The signal that is amplified during the first passage through the Erbium-doped fiber now enters the circulator (12) through port ($C_{C12}$) and is then forwarded to port (Bc12), in which is connected one of the extremities of the DCF (11). The signal travels only once and in one unique direction, through the DCF in which the dispersions are compensated, and then is forwarded to port ($A_{C12}$) of the circulator (12), which is connected to the other extremity of the DCF. The circulator (12) then forwards this signal to its port ($C_{C12}$), making it to return to the Erbium-doped fiber, where it is amplified once again. After the second passage through the Erbium-doped fiber, the signal travels again through the multiplexer (3), entering the port ($C_{M3}$), and exiting the port ($A_{M3}$) that is connected to port ($C_{C6}$) of the circulator (6), which forwards this amplified and compensated signal to its output port ($B_{C6}$). The insertion of the circulator (12) between the amplifier circuit and the DCF fiber (11) prevents the Brillouin and Rayleigh backscattering Generated in the DCF fiber from returning to the Erbium-doped fiber together with the signal, and results in a great improvement in the Signal-to-Noise ratio of the amplifier and in the performance in the reception of the signal in the system receiver, something that cannot occur if the signal returns through the same DCF. Another improvement factor consists on eliminating the need to use components that depend on the signal polarization, such as, polarization controller, polarization multiplexer and Faraday rotator mirror.

The method to apply the invention, shown in FIG. 5, was tested, and the results are displayed in FIG. 6 and 7. FIG. 6 shows the gain (difference between the output power and the input power of the amplifier, expressed in dB) and the noise figure (difference between the Signal-to-Noise ratio in the input and output of the amplifier, expressed in dB), whereas FIG. 7 shows the results of systemic tests promoted by a wavelength of 1590 nm, at a transmission rate of 10 Gbits/s, where:

the curve (A) represents the performance measurement of an ideal link where the receiver was connected directly to the receiver through an insignificant length of the fiber optic (back to back).

curve (B) represents the performance measurements of a real link of 75 km of fiber optic with no amplifier.

curve (C) represents the performance measurements of a real link of 75 km, where the amplifier in FIG. 5 has been installed in the link (line amplifier) in a position where it receives a power of −20 dBm.

curve (D) represents the performance measurements of a real link of 75 km, where the amplifier in FIG. 5 has been installed in the link (line amplifier) in a position where it receives a power of −10 dBm.

curve (E) represents the performance measurements of a real link of 75 km of fiber optic, where the amplifier in FIG. 5 has been positioned exactly before the receiver (pre-amplifier).

The measurements represented in FIG. 7 show that the use of the amplifier in FIG. 5 shift the performance curves to the left, displaying that, under these conditions, the link requires less power to reach the same level of BER error rate, proving that the use of the amplifier in FIG. 5 allows the use of larger links for the same transmission power.

The results prove that when the amplifier in FIG. 5 is used, both attenuation compensation and dispersion functions caused by conventional fiber are compensated. The curves linearity in the BER graph also shows that the backscattering has been eliminated by the interference of the circulator (12) between the DCF fiber and the rest of the amplifier circuit.

Another method to apply the invention consists of the circuit represented in FIG. 8, where the circulator (12) is replaced by a set of optical devices composed by a power divider (17) and two isolators (15 and 16), which in cooperation will perform the same function as the circulator (12).

In addition, another concept of the invention consist of the circuit represented in FIG. 9, which is created adding an optical gain flattening filter (13) to the circuit in FIG. 5. The filter is inserted in the circuit, between the Erbium-doped fiber (2) and the circulator (12), in order to produce a more flattened gain curve in the amplifier usage spectrum.

It is important to point out that the insertion of the optical filter (13) is not limited to the concept represented in FIG. 5, but it extends to all the methods to apply the invention.

Although according to the invention principles, the fiber with its own features to compensate the effects of dispersion is by preference the DCF, other types of different fibers may be used instead, separately or together, with the purpose to correct the signal, without diverting from the scope of the invention.

Then, although the device used to isolate the compensating fiber from the rest of the amplifier circuit in the invention is, as a preference, a circulator, other types and numbers of devices may be used, working separately or together, to perform the same function without diverting from the scope of the invention.

Even if the invention has been described in connection to some preferred modalities of application, it should be highlighted that the purpose was not to limit the invention to those particular modalities. On the contrary, the purpose was to cover all possible alternatives, modifications and similarities within the scope of the invention.

What is claimed is:

1. A double pass optical amplifier with unidirectional compensation of chromatic dispersion and obstruction of backscattering, comprising a circulator for receiving an input optical signal and outputting an amplified optical signal, an amplification stage including a pumping laser and a multiplexer for receiving the input optical signal from the circulator and an output from the pumping laser, and an Erbium-doped fiber connected to the output of the multiplexer and in which the optical signal undergoes an initial amplification while passing through the Erbium-doped fiber on the way through the fiber and a second amplification on the way back, said optical amplifier having, after the amplification stage, at least one dispersion compensating fiber whose input and output are connected to the Erbium-doped fiber, and at least one device arranged in the circuit to prevent backscattering generated in the dispersion compensating fiber from returning to the Erbium-doped fiber, and to allow the optical signal to travel through the dispersion compensating fiber only once and in one direction, and then return to the amplifier circuit for the second amplification.

2. A double pass optical amplifier with unidirectional compensation of chromatic dispersion and obstruction of backscattering, according to claim 1, wherein the said device is a second circulator connected between the dispersion compensating fiber and the Erbium-doped fiber.

3. A double pass optical amplifier with unidirectional compensation of chromatic dispersion and obstruction of backscattering, according to claim 1, wherein the dispersion compensating fiber is connected to the Erbium-doped fiber by said device, said device including a set of optical devices composed of a power divider connected to two isolators, the divider being connected to the Erbium-doped fiber and the isolators connected to a respective extremity of the dispersion compensating fiber.

4. A double pass optical amplifier with unidirectional compensation of chromatic dispersion and obstruction of backscattering, according to claim 1, further comprising an optical filter connected between the Erbium-doped fiber and the said device.

* * * * *